May 26, 1936.  H. C. PIERLE  2,042,123
LOADING AND UNLOADING OF WORK IN MACHINE TOOLS
Filed April 9, 1935  4 Sheets-Sheet 1

Inventor
Henry C. Pierle
By
Allen & Allen
Attorneys

May 26, 1936.　　　H. C. PIERLE　　　2,042,123
LOADING AND UNLOADING OF WORK IN MACHINE TOOLS
Filed April 9, 1935　　　4 Sheets-Sheet 3
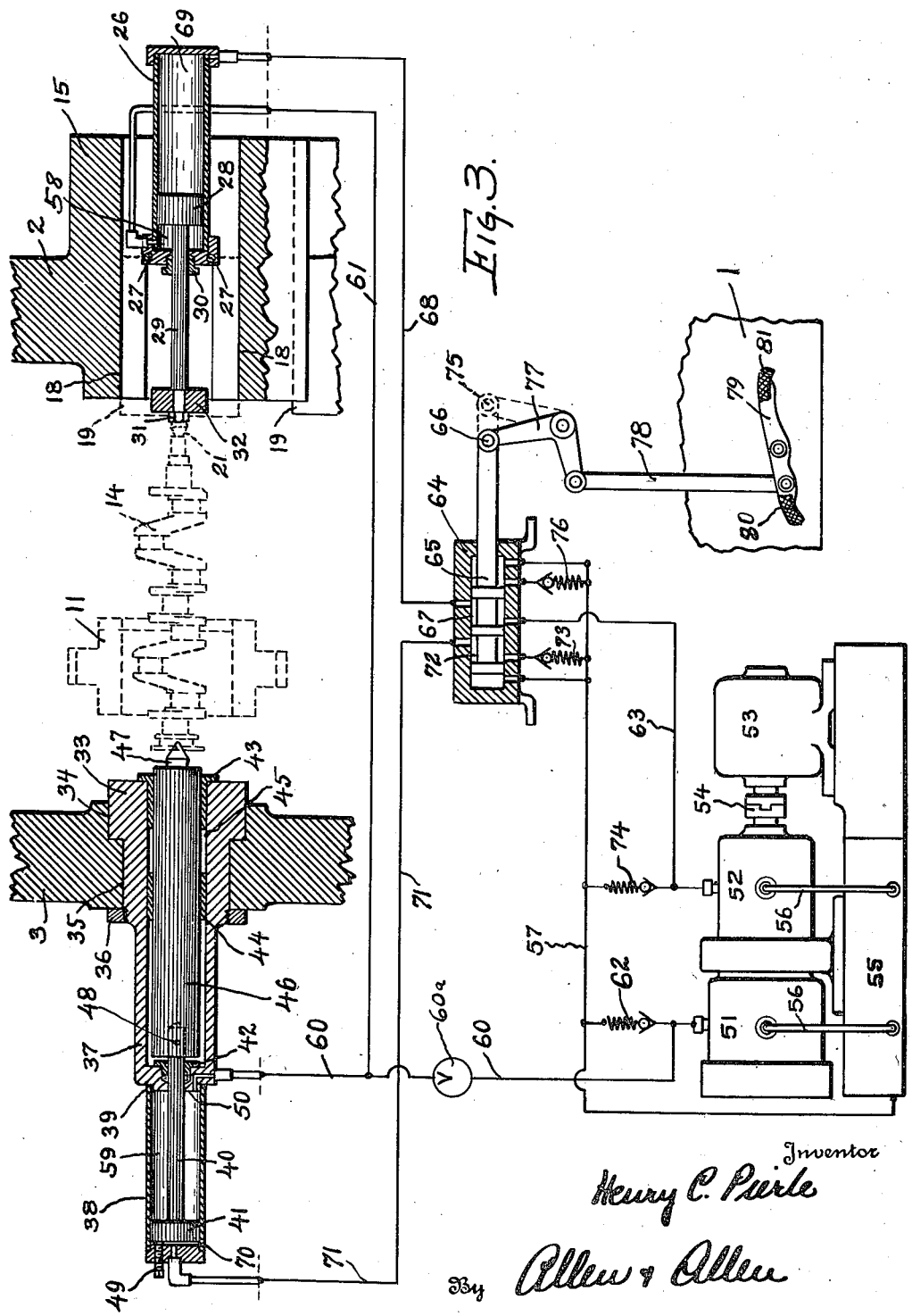
Inventor
Henry C. Pierle
By Allen & Allen
Attorneys

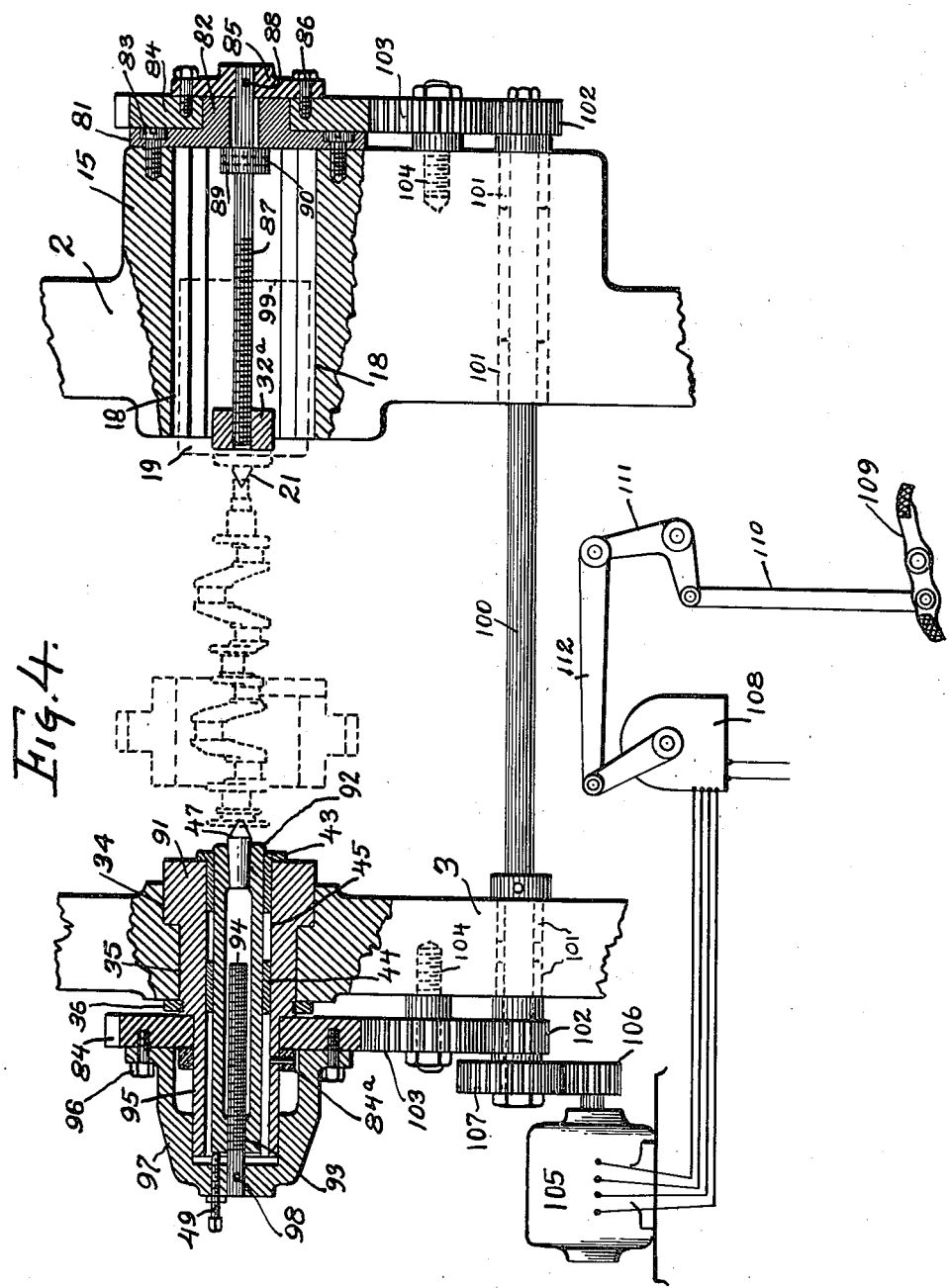

UNITED STATES PATENT OFFICE 2,042,123

LOADING AND UNLOADING OF WORK IN MACHINE TOOLS

Henry C. Pierle, Cincinnati, Ohio, assignor to The R. K. Le Blond Machine Tool Company, Cincinnati, Ohio, a corporation of Delaware Application April 9, 1935, Serial No. 15,457

15 Claims. (Cl. 82—9)

This invention pertains to a work loading device for machine tools, more particularly to a class of machines known as center drive lathes; and an object of the invention is to provide mechanism whereby a work piece is loaded and unloaded endwise through a center drive chuck or plurality of such chucks. More specifically it is an object of my invention to provide a pair of opposed centers, movable axially in synchronism, such as may carry a crank shaft on the axis of its main bearings, which centers carry the work, while so held, endwise through the center drive chuck or chucks to a definite axial position either for gripping and location by the chucks in definite axial alignment with the centers and in definite index and driving relation to the chucks and the cutting tools, or for removal from the machine.

A further object of my invention is to apply such a loading device to a center drive lathe having a plurality of work spindles in such a way that work may be loaded and unloaded independently on each spindle or simultaneously on all of the spindles.

Another object of my invention is to provide either hydraulic or mechanical means for actuating the centers axially in synchronism.

I have not shown a complete lathe since this is not required for a full explanation and understanding of my invention. For purposes of illustrating specific types of machines and chucks to which this invention may be applicable I cite: Groene, Patent No. 1,843,359, dated February 2, 1932; Groene et al. application Serial No. 748,720, filed October 17, 1934; and Groene et al. Serial No. 2,638, filed January 21, 1935.

I have shown, for purposes of illustration, a specific embodiment of my invention in a two spindle center drive crank shaft lathe. However, it is to be clearly understood that my invention is in no way limited to such structure and may be applied to any machine tool wherein its characteristics are desirable.

The objects of my invention which I have set forth and others which will be mentioned hereinafter, or will be apparent to one skilled in the art upon reading these specifications, I accomplish by that certain construction and arrangement of parts and by that process of which I shall hereinafter describe the aforesaid exemplary embodiments. References made to the drawings wherein:

Figure 3 is a diagrammatic illustration, partly in section, of hydraulic actuating mechanism for the centers.

Figure 4 is a diagrammatic illustration, partly in section, of mechanical actuating mechanism for the centers.

Figure 1:
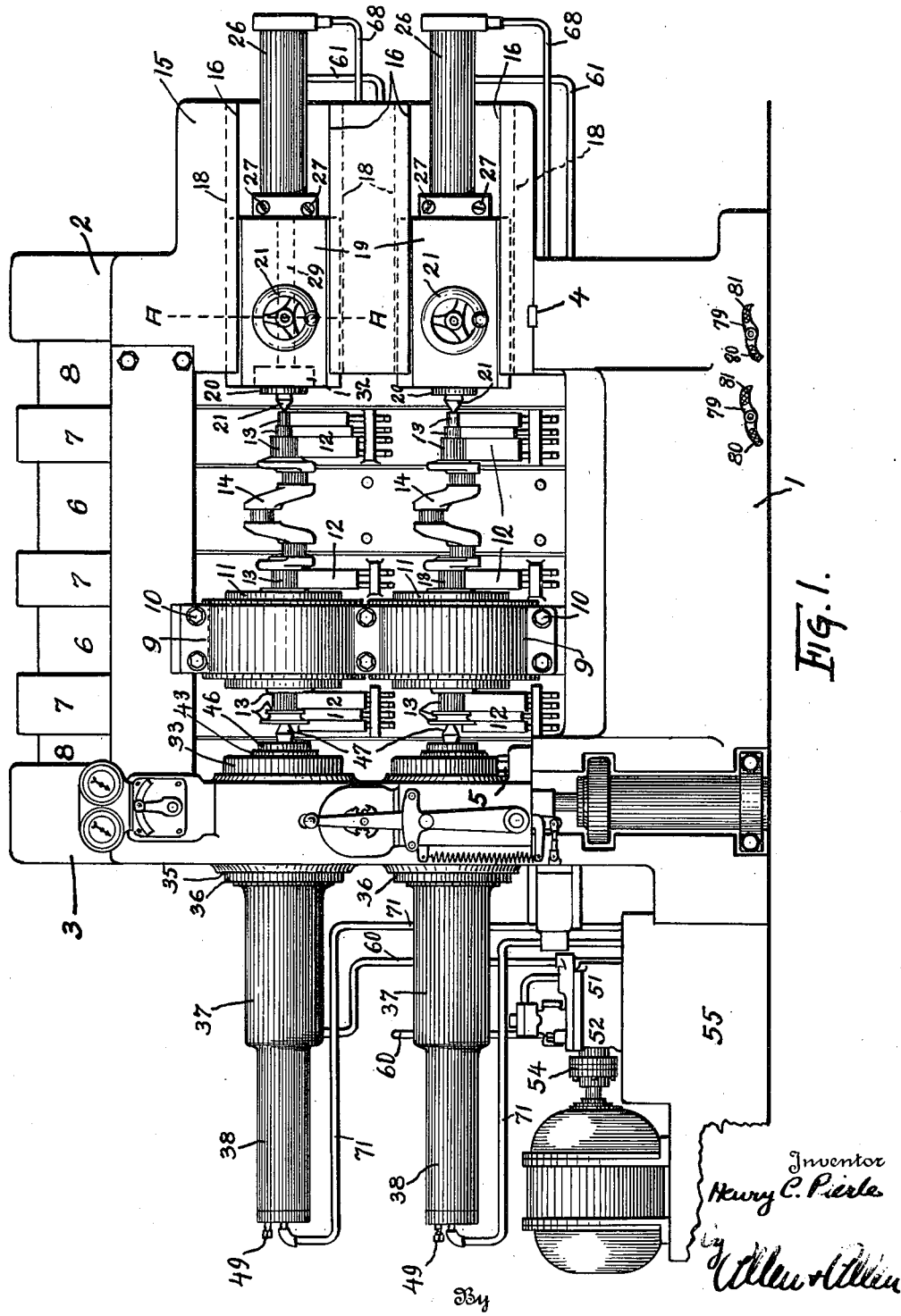
Figure 1 is a front elevation of the machine with the work shown gripped in the center drive chucks for the turning operation.

Referring now to the drawings, particularly Figure 1, the base of the machine is indicated at 10. A right hand housing 2 and a left hand housing 3 are suitably secured to the base 1 by keys 4 and bolts 5. Between the housings 2 and 3 are a series of center drive chuck units 6, tool holder units 7, and end thrust plates 8 all properly held together in operating relation as set forth in Groene Reissue Patent 18,662, issued November 22, 1932.

A center drive chuck housing 9 secured by bolts 10 to the center drive chuck unit 6 carries two center drive chuck assemblies 11, as set forth in Groene et al. Serial No. 2,638, filed January 21, 1935. It is to be noted that while center drive chucks are shown only on the left hand center drive chuck unit 6, chucks may also be applied to the right hand unit 6 should the work prove too limber to withstand the cutting forces exerted by the tools. Properly designed tools 12, secured to the tool holders 7, operate on the surfaces 13 of the crank shaft 14 as they are fed to the work by the motion of the tool holder units 7.

Figure 2:
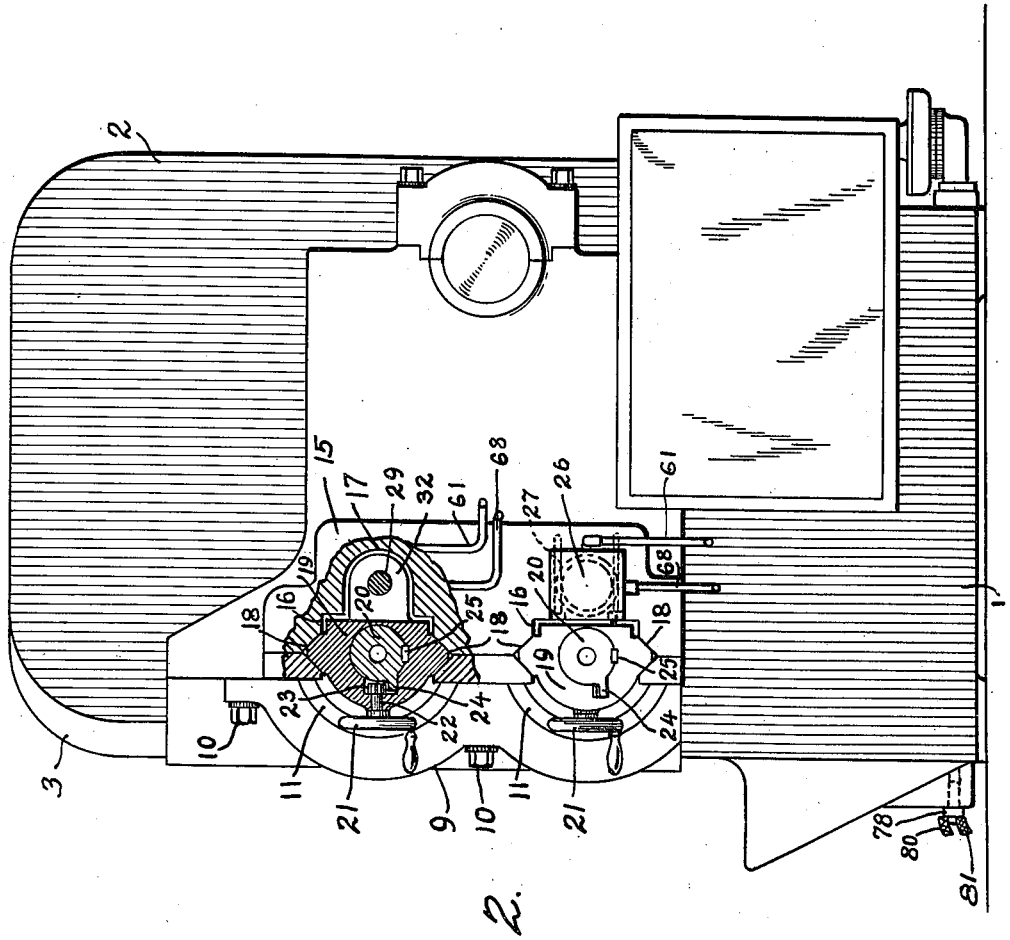
Figure 2 is a right hand end elevation, partly in section on line A—A of Figure 1.

Referring now particularly to Figures 1, 2 and 3, the right hand housing 2 carries an integral boss 15. A rectangular slot 16 and a semi-circular slot 17 are provided for each work spindle. In the horizontal surfaces of the rectangular slots 16 are accurately machined V-grooves or ways 18, in exact parallelism with the axes of the work spindles, in which the slides 19 are free to move longitudinally. Tubular members 20 carrying the centers 21 are mounted for longitudinal movement parallel with the work spindle axes by manual operation of handwheels 21 through the shafts 22 and pinions 23, the pinions engaging suitable racks 24 formed integral with the tubular members 20. This mechanism is provided for the proper adjustment of the centers to variations in the longitudinal centering of the workpieces and to assist in placing the work on or removing it from the centers. Keys 25 are provided to prevent turning of the tubular members 20 as the work is revolved.

Hydraulic cylinders 26 are secured to the boss 15 by bolts 27 and have pistons 28 connected to the piston rods 29 which pass through the usual packing 30. The outer ends of the piston rods 29 are bolted at 31 to lugs 32 formed integral with the slides 19 and moving in the slots 17 so that as the pistons 28 are reciprocated under hydraulic pressure the slides 19 and centers 21 are also reciprocated therewith.

The spindles 33 are secured in the bores 34 and 35 in the left hand housing 3 by means of the nuts 36. The projecting ends 37 of the spindles 33 carry the hydraulic cylinders 38 secured thereto by threaded means at 39. The piston rods 40 are attached to pistons 41 in the hydraulic cylinders 38 and are carried through the usual packings 42 held in the ends 37 of spindles 33. Bushings 43 and 44 are provided in the bores 45 of spindles 33 in which the tubular members 46, carrying the centers 47, are free to slide longitudinally on the work spindle axes. The piston rods 40 are securely connected to the tubular members 46 by suitable means 48 so that as the pistons 41 and their rods 40 are reciprocated under hydraulic pressure, the tubular members 46 and their centers 47 are similarly reciprocated. In order to properly position the work crank shafts 14 in correct axial location relative to the chucks 11 and the tools 12, adjustable stop means 49 are provided to limit the endwise travel to the left or loaded position of the centers 47 through the members 46, 40 and 41. This in turn limits the position of the work pieces 14 and the right hand centers 21 and their slides 19 and pistons 28. The limitation of the travel to the right or to the unloaded position is provided by the pistons 41 striking against the surfaces 50 of the extensions 37 of spindles 33.

Fluid pressure for actuating the hydraulic cylinders 26 and 38 is derived from a standard commercial compound hydraulic pump consisting of a low pressure unit 51 and a high pressure unit 52 driven by the usual electric motor 53 through a coupling 54. An oil reservoir 55 is connected to the pumps 51 and 52 through lines 56 in order to keep the pumps primed at all times. A drain or return line 57 takes care of the discharge through the various relief valves.

The high pressure pump 52 delivers fluid through the line 63 to a distributing valve 64. As illustrated in Figure 3, the plunger 65 of the valve 64 is to the left position 66. It can be clearly seen that in this position of the valve the high pressure fluid can pass from line 63 through chamber 67 of the valve 64 and through line 68 into the piston head chamber 69 of cylinder 26. This causes piston 28 to move to the left, moving the work 14 and piston 41 also to the left through the means already described. Oil is displaced from the piston head chamber 70 of cylinder 38 through line 71 and chamber 72 of valve 64 and is bypassed through a medium pressure relief valve 73. The relief valve 73 is set at a greater pressure than the low pressure relief valve 62 but at a lower pressure than the high pressure relief valve 74. Consequently as the device moves longitudinally to the left, back pressure is built up against the pressure in the chamber 69 by a lesser pressure in the chamber 70 so as to prevent jumping and to keep the work 14 securely held on the centers 21 and 47. When the longitudinal movement to the left is stopped by piston 41 striking the adjustable stop 49, the back pressure built up in chamber 69 is allowed to escape through the high pressure relief valve 74.

The low pressure pump 51 keeps the piston rod chambers 58 and 59 of the respective cylinders 26 and 38 charged at all times with fluid pressure through lines 60 and 61, the excess fluid being bypassed through the low pressure relief valve 62. As the device travels longitudinally to the left fluid is ejected from chamber 58 of cylinder 26 through line 61 into chamber 59 of cylinder 38. Any inequalties in the displacements of the chambers 58 and 59 are taken care of by the supply from the low pressure pump 51 or by escape through the low pressure relief valve 62. Such an arrangement prevents jumping in the longitudinal movement. When it is desired to move the centers longitudinally in synchronism without having the work inserted between the centers, the shut-off valve 60a is closed.

When the piston 65 of the valve 64 is moved to its right hand position 75, high pressure is applied in the chamber 70 and fluid is ejected from the chamber 69 through the line 68 and bypassed through the medium pressure relief valve 76, which is identical with valve 73, thus causing the device to move longitudinally to the right until the piston 41 strikes the surface 50, as previously described. The pressure thus built up escapes through the high pressure relief valve 74. The low pressure pump 51 and its circuit function the same for either direction of movement of the device.

Suitable levers and linkage 77, 78 and 79 are provided so that the valve 64 may be controlled by the foot, leaving the operator's hands free to place the work in, or remove it from the centers. As the pedal 80 is pushed down, the work 14 is moved endwise to the left into the chuck 11, and it is moved endwise out of the chuck when the pedal 81 is pressed down. By using one valve 64 and control means 78 for each work spindle, a device may be operated independently on each spindle. Should it be desirable to operate the devices on both spindles simultaneously, both devices may be connected in parallel to one valve 64 and control means 78.

Referring now particularly to Figure 4, which shows a mechanical actuating mechanism for the centers, a plate 81 having a hub 82 is secured by bolts 83 to the boss 15 of the right hand housing 2. A gear 84, which runs loose on the hub 82, is fastened to a disc 85 by means of bolts 86. A screw 87 is pinned at 88 to the disc 85 on the axial center of rotation of the gear 84 and disc 85. A suitable thrust collar 89 is secured to the screw by the pin 90. The screw operates in a nut 32a which is an integral part of the slide 19 so that as the gear 84 is rotated one way or the other, the slide may be similarly reciprocated longitudinally.

In the bores 34 and 35 of the left hand housing 3 is held a spindle 91 by means of a nut 36. Bushings 43 and 44 are provided in the bore 45 of the spindle 91 in which the tubular member 92, carrying the center 47, is free to move axially. Threads 93 are provided in the rear end of the tubular member 92 in which a screw 94 operates. A gear 84 runs loosely on an extension 95 of the spindle 91, being held thereon by collar 84a. Secured to the gear 84 by bolts 96 is a hub piece 97 also journaled on the extension 95. The screw 94 is pinned at 98 to the hub piece 97 on the axis of rotation of the gear 84 and the hub piece 97, so that as the gear 84 is rotated one way or the other, the tubular member 92 with its center 47 is similarly reciprocated axially. Adjustable stop means 49 are provided for limiting the travel of the device to the left, as was described in connection with the hydraulic controlling means.

Travel to the right is stopped by the face 99 of the slide 19 butting against the plate 81.

A drive shaft 100 is journaled in the housings 2 and 3 in suitable bushings 101. Two like pinions 102, keyed to the other ends of the drive shaft 100, drive the gears 84 through idler gears 103 carried on studs 104 secured in the housings. The screws 87 and 94 are identical and of the same hand and, since the gear ratio between pinion 102 and gear 84 is the same on both housings 2 and 3, as the drive shaft 100 is revolved one way of the other, the centers 21 and 47 are reciprocated in synchronism with each other.

Reversible power means 105 are applied to the drive shaft 100 through suitable transmission gear means 106 and 107. A reversing switch 108 for the power means 105 is operated through a suitable treadle 109 connected by link 110, bell crank 111 and link 112, this operating mechanism being similar to that described for the hydraulic unit.

Since the centering of the work may be accomplished by chucks as well as by centers, it is to be understood that when I speak of centers, I mean any work holding means at the ends of the work piece.

It is to be understood that different forms of my preferred embodiment may be made without departing from the spirit of my invention.

Having thus fully described my invention, what I claim as new and desire to secure by Letters Patent is:—

1. In a lathe provided with centers and with at least one center drive chuck adapted for axial loading, means in connection with said lathe centers for moving said work axially of said chuck to gripping and unloading positions, while said work is centered.

2. In a lathe provided with centers and with at least one center drive chuck adapted for axial loading, means in connection with said lathe mechanism for moving said work axially of said chuck to gripping and unloading positions, while said work is approximately centered, said means comprising means for moving the centers and said work as a unit axially of said chuck.

3. A lathe having head and tail stock centers and at least one center drive chuck adapted for axial loading, and means for moving said head and tail stock centers simultaneously, whereby to move a work piece held therebetween axially of said chuck, to gripping and unloading positions.

4. A lathe having head and tail stock centers and at least one center drive chuck, and means for moving said head and tail stock centers simultaneously, whereby to move a work piece held therebetween axially through said chuck, said means comprising a mounting for one of said centers interspaced from the point of work engagement thereof, so that said center may be moved until said point of work engagement passes substantially through said chuck.

5. In a lathe having head and tail stock centers and a center drive chuck, slidable mountings for said centers adapted to cause the work engaging portions of one of said centers, upon movement thereof, to pass substantially through said chuck, and means for moving said centers on said mountings in engagement with a work piece.

6. In a lathe having head and tail stock centers and a center drive chuck, slidable mountings for said centers adapted to cause the work engaging portions of one of said centers upon movement thereof, to pass substantially through said chuck, and means for moving said centers on said mountings in engagement with a work piece, said means comprising means for moving said centers simultaneously by like amounts, and means for exerting pressure on a work piece between said centers during said movement.

7. A lathe having a center drive chuck and an additional work holding means, and means for moving said work holding means while in an engagement with said work in a direction axially of said chuck, so as to move said work to a position lying substantially beyond said chuck, whereby said work may be removed from said lathe.

8. In a lathe having head and tail stock centers and a center drive chuck, means for synchronously moving said centers axially of said chuck to a position in which a work piece held therebetween will lie substantially beyond said chuck, said means comprising slidable mountings for said centers, fluid pressure actuating means therefore, and a synchronizing interconnection between said fluid pressure actuating means.

9. In a lathe having head and tail stock centers and a center drive chuck, means for synchronously moving said centers axially of said chuck to a position in which a work piece held therebetween will lie substantially beyond said chuck, said means comprising slidable mountings for said centers, fluid pressure actuating means therefor, and a synchronizing interconnection between said fluid pressure actuating means, and means for exerting a back fluid pressure on one of said mountings during said movement.

10. In a lathe having head and tail stock centers between which a work piece is adapted to be supported, and a center drive chuck, hydraulic means for moving one of said centers in the direction of the other center, additional hydraulic means actuated by said first mentioned means, for moving said other center axially in the same direction as said first center, whereby said work piece held between said centers may be moved to a position entirely outside said center drive chuck.

11. In a lathe having head and tail stock centers, hydraulic means for moving one of said centers in the direction of the other center, additional hydraulic means actuated by said first mentioned means, for moving said other center axially in the same direction as said first center, and additional hydraulic means providing a back pressure on at least one of said centers, whereby during conjoint movement of said centers an engaging pressure may be maintained upon a work piece held therebetween.

12. In a lathe having head and tail stock centers, means for moving said centers axially and in synchronism in either direction, said means comprising a motive means, a counter shaft driven thereby, and a pair of identical gear trains driven by said counter shaft, each of said gear trains driving a lead screw of the same hand and nuts threaded on said screws, said head and tail stock centers, respectively, connected to said nuts.

13. In a lathe having head and tail stock centers, each of said centers being connected by means of rods to pistons reciprocating in hydraulic cylinders, a supply of fluid under high pressure and a supply of fluid under low pressure, a distributing valve by means of which the high pressure fluid may be admitted selectively to the head end of either piston, the head end of the other piston being thereby connected through a medium pressure valve to a fluid reservoir, a connection between the rod ends of the cylinders, to which connection the source of low pressure fluid is constantly connected, whereby a back pressure is maintained on the cylinders and the axial movement of the centers in either direction is accomplished in exact synchronism.

14. A lathe having head and tail stock centers and at least one center drive chuck, and means for moving said head and tail stock centers simultaneously, whereby to move a work piece held therebetween axially of said chuck, and means for adjusting the relative position of one center with respect to the other.

15. In a lathe having a plurality of head and tail stock centers, means for producing axial movement of each pair of centers in either direction in synchronism whereby the center-to-center distance of each pair is maintained constant during such movement, said means being independent for each pair of centers.

HENRY C. PIERLE.